Aug. 31, 1937.     F. T. BROWN     2,091,748
MOTOR VEHICLE
Filed April 20, 1935
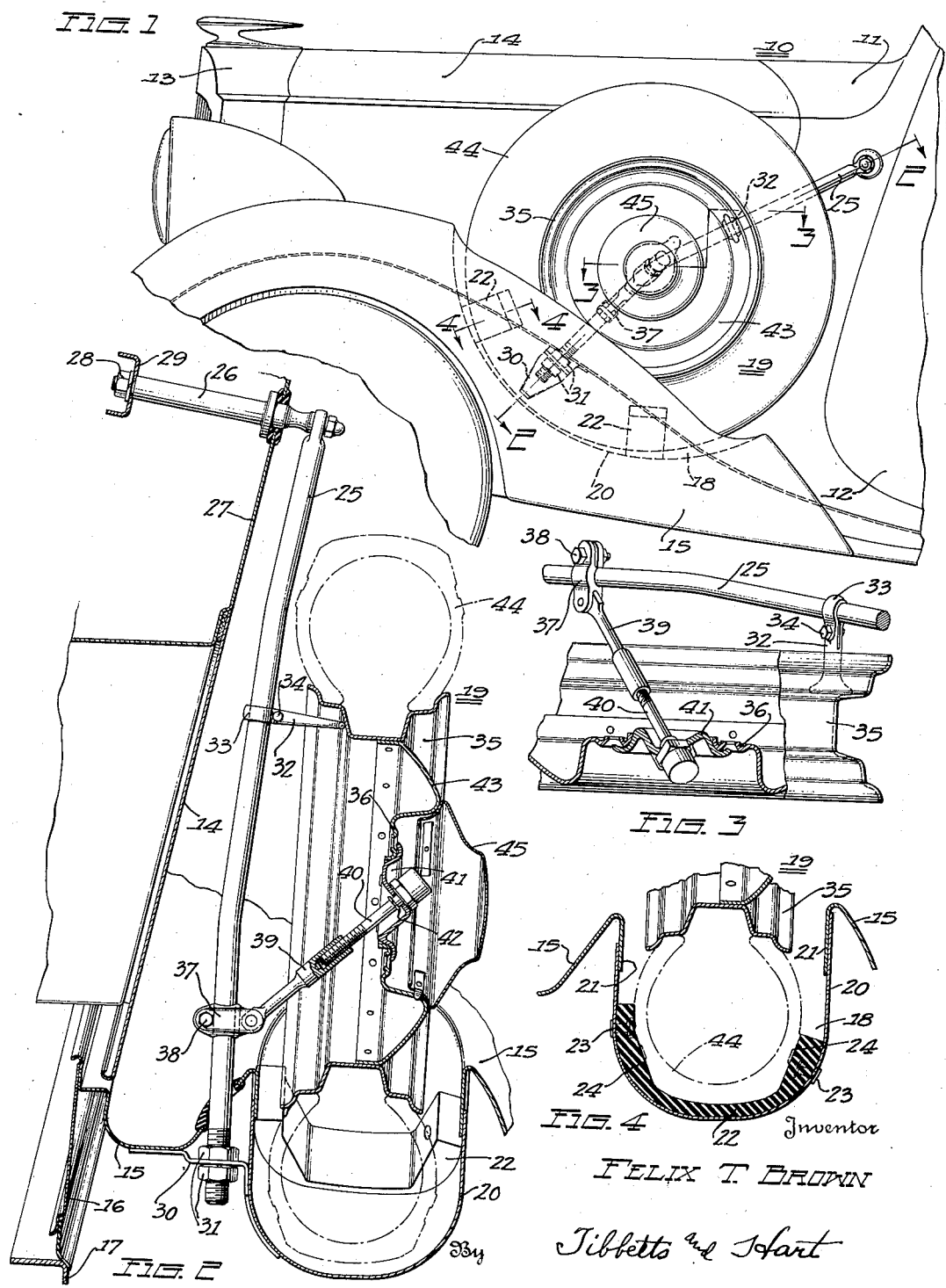
Inventor
FELIX T. BROWN
By Tibbetts and Hart
Attorneys Patented Aug. 31, 1937

2,091,748

UNITED STATES PATENT OFFICE 2,091,748

MOTOR VEHICLE

Felix T. Brown, Detroit, Mich., assignor to Packard Motor Car Company, Detroit, Mich., a corporation of Michigan Application April 20, 1935, Serial No. 17,515

6 Claims. (Cl. 224—29)

This invention relates to motor vehicles and more particularly to spare wheel mountings.

When spare wheels are carried exteriorly of motor vehicles it is the usual practice to provide mounting means either at the rear of the body or at the sides of the engine bonnet in advance of the doors adjacent the driver. When the spare wheels are to be positioned adjacent the bonnet the fenders are usually formed with wells for receiving the wheel tires and the present tendency is toward increasing well depth.

When spare wheels are to be placed in or removed from fender wells they must usually be lifted vertically and toward or away from the handler. Such lifting is difficult and awkward because the wheels are heavy and they must be held with the arms extended. Further, the carriers must be adjusted so that parts thereof do not interfere with moving the spare wheels into or out of the wells. Such carrier adjustments and wheel handling are objectionable to the average driver.

An object of the invention is to provide a vehicle fender well mounting with which spare wheels can be associated and removed with a minimum physical effort.

Another object of the invention is to provide a fender well mounting for holding spare wheels tightly in an upright position.

A further object of the invention is to provide a fender well spare wheel mounting which will exert a downward and inward pressure against the wheel to hold it tightly in upright position.

Other objects of the invention will appear from the following description taken in connection with the drawing, which forms a part of this specification, and in which:

Fig. 1 is a side elevational view of the forward end of a motor vehicle having the invention associated therewith;

Fig. 2 is a sectional view taken on line 2—2 of Fig. 1 showing the details of the spare wheel mounting;

Fig. 3 is a sectional view taken on line 3—3 of Fig. 1;

Fig. 4 is a sectional view taken on line 4—4 of Fig. 1 illustrating the tire receiving portion of the wheel mounting.

The forward end of a motor vehicle is indicated at 10. Such vehicle has a body 11 and doors as indicated at 12. There is a radiator shell 13 at the front end of the vehicle and between such shell and the forward end of the body is a motor (not shown) covered by a bonnet 14. A fender structure 15 is associated with the vehicle on each side of the bonnet and such fenders are secured to fender shields 16 fixed to enclose the space between the sides of the bonnet 14 and the side sills 17 of the vehicle main frame. Such fender shields are suitably fixed to the fender structures and to the frame sills.

Formed in the fenders are similar wells, as indicated at 18, for the purpose of receiving spare wheels as indicated generally at 19. In the present instance the fender is formed with a well opening and a separate base element 20 is fixed to inturned flanges 21 of the fender by suitable fastening means such as welding. Within the well is arranged a pair of spaced shoes 22 preferably formed of relatively soft rubber and fastened therein by suitable means such as counter-sunk rivets 23. The side walls 24 of these shoes are thicker than the central portion to provide a wedging effect on the side walls of a spare wheel tire when inserted in the well. As the shoes can be slightly deformed they will accommodate tires of slightly varying dimensions.

The well and its shoes form a part of the spare wheel mounting and I will now describe the other portion of such mounting. A suitable support or standard is associated with the vehicle which, in the present instance, takes the form of a rod 25 mounted at its upper end on an anchor bolt 26 extending through an opening in the body panel 27 and secured by a nut 28 to a body frame member 29. The lower end of the rod is threaded and extends through an opening in a bracket 30, such bracket being fixed to the fender 15 and the well base 20. Suitable securing means, in the form of nuts 31, fix the threaded end of the rod with the bracket 30. This support or standard is formed to extend upwardly between the engine bonnet and the inner wall of the fender well so that the wheel can rest in an upright position without interference, the rod being slightly bent for this reason.

Mounted on the standard are a pair of means for positioning and holding the wheel in a substantially upright position in the fender well. A spacer and pivot member 32 is provided with a clamp end 33 through which the rod 25 can extend and a bolt 34 is associated therewith to tightly clamp the spacer in desired position on the rod. This spacer extends outwardly of the vehicle from the rod and is adapted to be engaged by the inner face of the spare wheel rim 35 at a point diametrically located between the shoes 22 in the fender well, the rod 25 extending rearwardly at an angle for this purpose. On the rod, below the hub 36 of the spare wheel, is mounted a clamp member 37 secured in desired vertical position by a bolt 38, such clamp member serving as an anchor for fastening means adapted to be associated with the spare hub. This fastening means consists of a rod 39, a bolt 40 and a bearing plate 41. The rod 39 is pivoted at its lower end to the clamp 37 and is internally threaded at its other end to receive the threaded end of the bolt 40. The bearing plate 41 is formed to engage over the exterior face of the spare wheel hub so that when the bolt 40 is screwed into the rod 39 the bearing plate will hold the spare wheel securely in the fender well. In order to prevent the bearing plate from slipping off of the bolt when the bolt is detached from the rod 39 there is provided a snap ring 42 engaging a groove in the bolt shank on the side of the bearing plate opposite from the bolt head.

The spare wheel herein illustrated is of a conventional disc type consisting of the rim 35, the hub 36 and the web 43 connecting the hub with the rim. A pneumatic tire 44 is fixed on the rim in the usual manner. A detachable hub plate 45 is associated with the wheel structure to enclose the hub opening. When the spare wheel is to be associated with its mounting or removed therefrom then of course this cover plate must be removed in order to manipulate the bolt 40.

As the arm 32 is clamped on the standard, it can be readily adjusted axially thereon to bring the bearing portion in desired relation to engage rims of varying diameters. The clamp 37 can also be adjusted axially on the standard to locate the rod 39 so that it aligns with the bolt 40 when associated to fasten spare wheels of varying diameters.

When the wheel is to be assembled with the mounting, it is lifted into the well while held at an angle and then pushed inwardly at the top until it engages the arm 32. The mounting parts do not interfere with such wheel movement and the necessity for holding the wheel well extended to place it vertically in the well is eliminated. The bolt 40 is then extended through the hub opening and screwed into the rod 39 until the retainer plate 41 holds the hub tightly in position. During the telescoping of the bolt in the rod the wheel pivots on the bearing end of the arm 32 and thus an inward force is applied to the lower portion of the wheel and a downward force is applied at the hub. Such applied forces tightly wedge the spare wheel in the rubber shoes in the fender well and the arm 32 maintains the upper portion of the wheel in a predetermined spaced relation from the bonnet. To remove the wheel, it is only necessary to unfasten the bolt from the rod and the wheel can then be tilted down and moved outwardly from the well at such angle.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a motor vehicle, the combination with means for receiving a spare wheel and limiting downward movement thereof, means for limiting inward movement of said wheel, and fastening means anchored to said motor vehicle and said wheel at vertically spaced points, said fastening means having portions relatively adjustable for applying to said wheel co-ordinated inward and downward forces to hold it immovably against the two said limiting means.

2. In a motor vehicle, a spare wheel mounting comprising a fender formed with a well for receiving the tire of a spare wheel, abutment means cooperating with said well for retaining said spare wheel in approximately a vertical plane, support means for limiting downward movement of said tire in said well, bearing means engaging said wheel at approximately the hub thereof, and interconnected aligned members relatively adjustable axially and terminally anchored relative to said vehicle and said bearing means at vertically spaced points for exerting against said bearing means a single composite force pressing said spare wheel inwardly and downwardly against said abutment and support means.

3. In a motor vehicle, a spare wheel mounting comprising a fender having a tire receiving well therein, a fixed support extending upwardly adjacent the inner boundary of the fender well, a spacer arm fixed on the support against which said wheel is adapted to engage, said arm limiting inward movement of the upper portion of the spare wheel, adjustable angularly disposed fastening means engaging the wheel hub, and anchor means for the fastening means slidingly and clampingly secured on the support and pivotally securing said fastening means below the wheel hub to accommodate movement of said fastening means in conjunction with said wheel, said fastening means having portions adjustable axially for drawing said wheel simultaneously against said arm and into said well.

4. In a motor vehicle, the combination of a vehicle member having a well for receiving the tire of a spare wheel, a fixed standard, means for supporting a lower peripheral portion of the tire, a spacer element attached to the standard and adapted to serve as a bearing against which an upper portion of the wheel rests whereby said wheel is supported in a predetermined plane, and means pivotally anchored at one end to said standard independent of said spacer element and engageable with said wheel hub at the other end, said means having portions relatively adjustable to apply a single force for moving said wheel inwardly and downwardly to secure the wheel relative to the vehicle member and against said spacer element.

5. In a motor vehicle, the combination of a vehicle member having a well for receiving the tire of a spare wheel, a fixed support means proximate to and extending substantially parallel with the plane of the inner boundary of said well, means in the well for supporting a lower peripheral portion of the tire, a spacer arm fixed on said support means against which said wheel is adapted to engage, said arm limiting inward movement of the upper portion of said wheel, a bearing member engaging the wheel hub, and means anchored at one end relative to said support independent of said spacer element and engageable with said bearing member, said means having relatively movable portions the adjustment of which applies a single force pressing said wheel in two directions simultaneously whereby said wheel is held against said arm and said means in the well.

6. In a motor vehicle, the combination with means for receiving a portion of a spare wheel and limiting lateral and downward movement thereof, means spaced vertically from said receiving means for limiting lateral movement of said wheel, and fastening means anchored to the vehicle and the wheel at vertically spaced points, said fastening means comprising two threaded together portions adjustable relatively to reduce the length of said fastening means between the anchored points.

FELIX T. BROWN.